United States Patent [19]
Garcia

[11] Patent Number: 5,979,521
[45] Date of Patent: Nov. 9, 1999

[54] ADJUSTMENT MECHANISM

[75] Inventor: Jaime E. Garcia, Wexford, Pa.

[73] Assignee: Delta International Machinery Corp., Pittsburgh, Pa.

[21] Appl. No.: 09/235,922

[22] Filed: Jan. 22, 1999

[51] Int. Cl.[6] .................................................. B27C 1/00
[52] U.S. Cl. .................. 144/129; 144/114.1; 144/286.5; 108/71; 108/145; 403/69; 403/73; 403/119
[58] Field of Search ................................. 403/52, 67, 69, 403/72, 73, 119, 164; 108/33, 65, 71, 144, 145, 146, 147; 144/114.1, 117.1, 129, 130, 329, 253.1, 286.1, 286.5, 286.7

[56] References Cited

U.S. PATENT DOCUMENTS

| | | | |
|---|---|---|---|
| 556,015 | 3/1896 | Marsh . | |
| 1,583,879 | 5/1926 | Hallock . | |
| 2,601,879 | 7/1952 | Van Dam | 144/129 |
| 2,804,107 | 8/1957 | Taylor | 144/129 |
| 3,171,454 | 3/1965 | Boice . | |
| 3,213,809 | 10/1965 | Kritske . | |
| 4,502,394 | 3/1985 | Veyhl . | |
| 4,559,879 | 12/1985 | Häusser . | |
| 5,024,257 | 6/1991 | Lloyd . | |
| 5,143,128 | 9/1992 | Chen . | |
| 5,255,724 | 10/1993 | Butke | 144/114.1 |
| 5,649,493 | 7/1997 | Blume . | |

OTHER PUBLICATIONS

Instruction Manual for Delta International Machinery Corp. 6 "Variable Speed Bench Jointer (Model 37–070), dated Jul. 14, 1995.
Instruction Manual for Delta International Machinery Corp. 6 "Motorized Jointer (Model 37–280), dated May 14, 1993.
Instruction Manual for Delta International Machinery Corp. 6 "Deluxe Jointer (Model 37–190), dated Feb. 16, 1996.
Intstruction Manual for Delta International Machinery Corp. DJ–15 6 "Jointer, dated Nov. 28, 1995.
Instruction Manual for Delta International Machinery Corp. DJ–20 8 "Jointer (Model 37–350), dated Feb. 15, 1996.

*Primary Examiner*—W. Donald Bray
*Attorney, Agent, or Firm*—Kirkatrick & Lockhart LLP

[57] ABSTRACT

An adjustment mechanism for adjusting the position of a surface relative to a first element includes a first arm having first and second members. One of the first and second members is pivotally mounted to the first element about a first axis. The other of the first and second members is pivotally mounted to a second element, having the surface thereon, about a second axis. The first member includes a first bore therein, and at least a portion of the second member is received by and is slidably movable within the first bore. A locking mechanism selectively restrains sliding movement of the second member within the first bore to thereby adjust the length of the first arm and vary the position of the surface relative to the first element.

44 Claims, 11 Drawing Sheets

ADJUSTMENT MECHANISM

CROSS-REFERENCE TO RELATED APPLICATIONS

Not applicable.

FEDERALLY SPONSORED RESEARCH

Not applicable.

TECHNICAL FIELD AND INDUSTRIAL APPLICABILITY OF THE INVENTION

The present invention relates to adjustment apparatuses and, more particularly, to apparatuses for adjustment and locking of the workpiece support surface of machinery such as for example, woodworking and metal working machinery. The present invention may be adapted for use with any device having one or more surfaces that may be adjusted in position relative to one or more other elements of the device. Examples of possible applications of the adjustment apparatus of the present invention include use as a workpiece support surface height adjustment mechanism for the infeed table of a jointer.

DESCRIPTION OF THE INVENTION BACKGROUND

A number of known cutting devices include a driven cutting or abrading member such as, for example, a cylindrical blade, that is bordered on either side by a generally planar workpiece support surface. In such devices, a workpiece is advanced along the infeed table portion of the support surface toward the driven cutting member. The workpiece passes over the cutting member, where a portion of the workpiece (the stock) is removed therefrom, and onto the outfeed table portion of the support surface. A familiar example of such a device is a woodworking jointer, in which the cutting member includes a rotating cylinder having one or more elongate blades disposed along the length thereof so that a cutting surface of each blade is exposed and may contact a workpiece. The cutting member is rotationally mounted at a fixed height relative to a base in a recess between the infeed and outfeed tables.

In order to accurately remove the desired amount of stock from the workpiece, the position of the infeed table must be adjusted with some precision to a desired height relative to the cutting member. A variety of infeed table positioning devices are known to accomplish this task. However, these devices generally require that the operator of the jointer manipulate a variety of separate adjustment and locking components in order to adjust and lock the height of the infeed table. In particular, the operator must separately unlock, adjust, and re-lock the infeed table. Unlocking the infeed table so that its height may be freely adjusted is accomplished by, for example, unscrewing a threaded connector that frictionally fixes the height of the infeed table. Repositioning the height of the infeed table is accomplished by, for example, manually urging the infeed table up or down an inclined plane on a set of rails relative to the cutting member and the outfeed table. Finally, re-locking the infeed table is accomplished by, for example, tightening the threaded connector mentioned above. The locking mechanism may be located on a side of the jointer that requires the operator to change his or her position to manipulate the locking mechanism, further complicating the adjustment process.

It will be appreciated that, although such apparatuses described in general above may be used to successfully adjust the height of the infeed table relative to the cutting member, the number of individual operations that must be performed and the complexity of each of these operations does not lend itself to the quick and accurate adjustment of the infeed table. In particular, when it is necessary to perform a number of jobs in succession that require the infeed table to be adjusted to a variety of heights, the loosening, repositioning, and tightening procedure required to adjust the table may need to be repeated a number of times. Therefore, it is desirable to reduce the time, complexity, and number of steps that are required to reposition the infeed table of the jointer while allowing an accurate positioning of the height at which the infeed table is positioned.

Accordingly, it would be advantageous to provide a mechanism by which the height of the infeed table of a jointer may be quickly and easily repositioned relative to other elements of the jointer to allow for rapid and precise adjustment and locking of the height of the infeed table relative to the cutting member. More broadly, there exists a need for an improved adjustment mechanism for adjusting and locking a position of a first surface of a woodworking, metal working, or other device relative to one or more other elements of the device.

SUMMARY OF THE INVENTION

In accordance with the present invention, there is provided an adjustment mechanism for adjusting the position of a surface relative to a first element. The surface is resident on a second element. The adjustment mechanism includes a first arm having first and second members. One of the first and second members is pivotally mounted to the first element about a first axis. The other of the first and second members is pivotally mounted to the second element about a second axis. The first member including a first bore therein, and at least a portion of the second member is received by and is slidably movable within the first bore. The invention also includes a locking mechanism that selectively restrains sliding movement of the second member within the first bore. By appropriately adjusting the position of the second member within the first bore of the first member, a length of the first arm is varied to thereby adjust the position of the surface relative to the first element.

The present invention also is directed to a workpiece table elevation adjustment mechanism that selectively adjusts an elevation of a workpiece support table relative to a base of a device for one of cutting and abrading a workpiece. The workpiece table elevation adjustment mechanism includes an adjustable arm of variable length and having a first end and a second end. One of the first end and the second end is pivotally mounted to the base about a first axis, and the other of the first end and the second end is mounted to the workpiece support table about a second axis. The adjustable arm also includes first and second sections. The second section includes a sleeve portion, and a region of the first section is received by and is slidably movable within the sleeve portion. A locking mechanism selectively restrains movement of the first section relative to the second section.

The present invention is further directed to an apparatus that includes an adjustment mechanism, and wherein the apparatus includes a base having a first inclined surface and support that is slidably mounted on the first inclined surface. The apparatus further includes a first arm having first and second members. One of the first and second members is pivotally mounted to the base about a first axis, and the other of the first and second members is pivotally mounted to the support about a second axis. The first member includes a first bore, and at least a portion of the second member is received by and is slidably movable within the bore. A locking mechanism selectively restrains the sliding movement of the second member within the first The present invention addresses shortcomings of the known adjustment mechanisms by providing a quick and easily manipulable arrangement for adjusting the position of a surface such as, for example, a workpiece support surface of a woodworking, metal working, or other machine or device, relative to another surface or element. These and other details, features and advantages will be apparent to those of ordinary skill as the following detailed description of embodiments of the invention proceeds.

BRIEF DESCRIPTION OF THE DRAWINGS

In the accompanying Figures, there are shown present preferred embodiments of the invention wherein like reference numerals are employed to designate like parts and wherein.

DESCRIPTION OF EMBODIMENTS OF THE INVENTION

Figure 1:
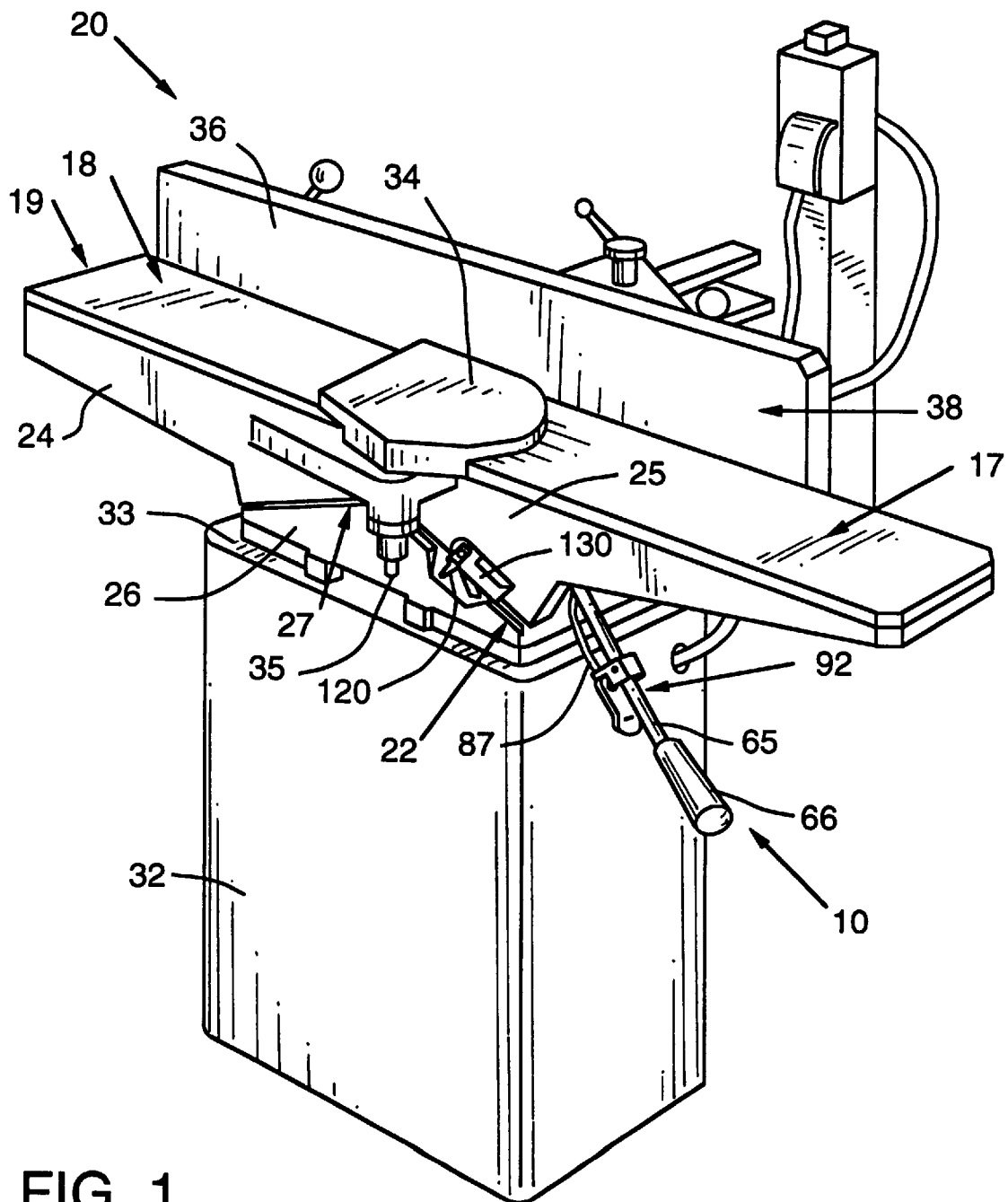
FIG. 1 is a perspective view of a jointer including an embodiment of the adjustment mechanism of the present invention.

While the present invention is susceptible of embodiment in many different forms, this specification and the accompanying drawings disclose only some specific forms as examples of the invention. The invention is not intended to be limited to the embodiments so described, and the scope of the invention is provided in the appended claims.

For ease of description, the invention and devices incorporating the invention may be described herein in a normal operating position, and terms such as upper, lower, horizontal, proximal, distal, etc., may be used with reference to the normal operating positions and the normal position of an operator using a device incorporating the invention. It will be understood, however, that the invention and devices incorporating it may be manufactured, stored, transported, used, and sold in orientations other than the positions described.

The adjustment mechanism of the invention may be incorporated in certain conventional components, of jointers and other devices, and the details of those conventional components, although not fully described or illustrated herein, will be apparent to those having ordinary skill in the art.

Referring now to the drawings for the purposes of illustrating the present preferred embodiments of the invention only and not for the purpose of limiting the same, the several drawings generally show various aspects of an embodiment of the present invention in the form of an adjustment mechanism 10 in use in connection with a woodworking jointer 20. While the present invention is particularly well-suited for adjustment and locking of the relative height of the infeed and outfeed tables 22 and 24, respectively, of the jointer 20 depicted in the several drawings submitted herewith, the skilled artisan will appreciate that the adjustment mechanism 10 of the present invention disclosed herein may be successfully employed in myriad of other applications in which the adjustment of one surface relative to another is required. Therefore, the jointer 20 is employed herein only as one example of the application of the invention to assist in the description of the invention. Accordingly, the scope of protection afforded the present invention may not be limited solely to use in connection with the jointer 20 of the type depicted in the Figures.

Figure 2:
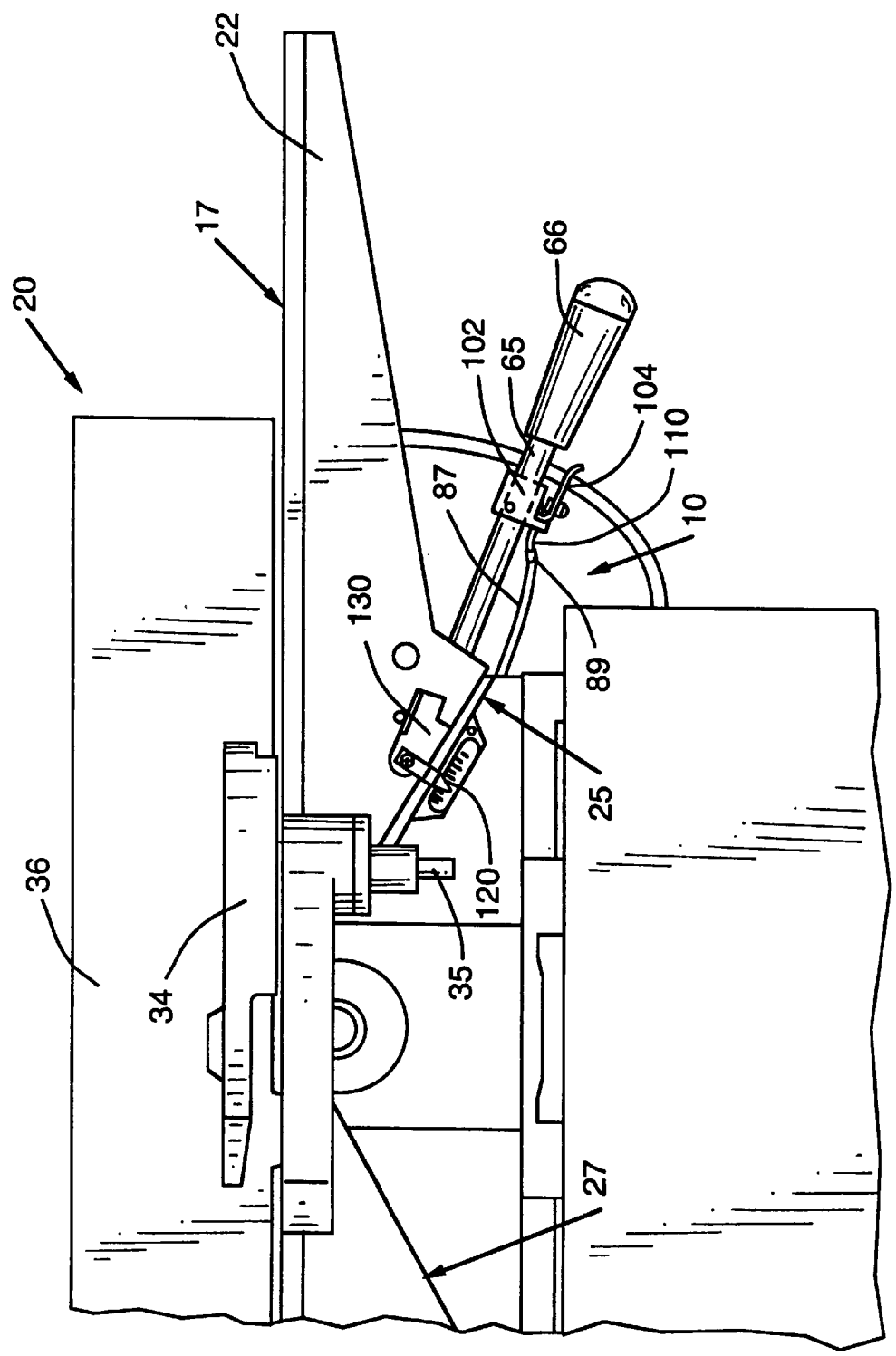
FIG. 2 is a front elevational view of a portion of the jointer of FIG. 1 particularly showing certain elements of an embodiment of the adjustment mechanism of FIG. 1.

With the exception of the adjustment mechanism of the present invention, the general construction and operation of the jointer 20 is well known in the art and will not be discussed in detail herein. Accordingly, only those conventional aspects of the jointer 20 considered helpful to illustrate the herein-described embodiments of the present invention are discussed below. As best shown in FIGS. 1 and 2, the jointer 20 depicted in the accompanying drawings generally includes a pedestal 32, a base 26, a support in the form of a workpiece support surface 19 including an infeed table 22 and an outfeed table 24, and a cutting member 28. The foregoing elements of the jointer 20 are preferably formed from a durable and rigid material such as steel or the like. The pedestal 32 acts to support the base 26 and provides a housing for the jointer motor (not shown). The pedestal 32 may be of various heights and sizes depending upon the particular requirements of the environment in which the jointer 20 will be used. The upper portion of the pedestal 32 forms a generally horizontal surface 33 upon which the base 26 is fixed. The upper surface of the base 26 forms a first inclined track 25 and a second inclined track 27. As will be described in greater detail below, the infeed table 22 and outfeed table 24 are slidably mounted on the first and second inclined tracks 25 and 27, respectively and may be positioned along the tracks to adjust their respective heights relative to the cutting member 28. The infeed and outfeed tables 22 and 24, respectively, each form generally smooth horizontal infeed and outfeed surfaces 17 and 18, respectively. Accordingly, the height of infeed and outfeed tables 22 and 24, respectively, and thus the height of infeed and outfeed surfaces 17 and 18, respectively, may be independently raised and lowered by adjusting the positions of the infeed and outfeed tables 22 and 24, respectively, along the first and second inclined tracks 25 and 27. In that way, the positions of the infeed and/or outfeed surfaces 17 and 18 relative to the cutting member 28 and the base 26 may be adjusted.

The first and second inclined tracks 25 and 27, respectively, are oppositely angled and slope upwardly along the right and left sides of the base 26, respectively, toward the middle of the base 26 and define a recess 30 therebetween running generally transverse to the direction of the first and second inclined tracks 25 and 27, respectively. The first inclined track 25 is adapted to slidably accept the infeed table 22 thereon. In particular, the first inclined track 25 includes two first inclined rails 29 disposed in parallel along the length thereof. The infeed table 22 includes two infeed table rails 23 disposed in parallel along the bottom surface thereof. The infeed table rails 23 are positioned and configured to slidably engage and ride upon the first inclined rails 29, thereby allowing the infeed table 22 to be slidably positioned on the first inclined track 25 of the base 26. Accordingly, the height of the infeed table 22 and its infeed surface 17 relative to the base 26 and the cutting member 28 may be adjusted by sliding the infeed table 22 to an appropriate position along the length of the first inclined rails 29 and securing the infeed table 22 in the desired position. As described further below, it will be appreciated that upper and lower infeed table stops 141 and 142, respectively, are provided to restrict the infeed table 22 from sliding off of the upper or lower ends of the first inclined rails 29.

The second inclined track 27 is adapted to slidingly engage the outfeed table 24 thereon. The design, operation, and interaction of the second inclined track 27 and the outfeed table 24 is substantially the same as that of the first inclined track 25 and the infeed table 22, as described above. Accordingly, the second inclined track 27 includes two second inclined rails (not shown) disposed in parallel along the length thereof. The outfeed table 24 includes two outfeed table rails (not shown) disposed in parallel along the bottom surface thereof. The outfeed table rails are positioned and configured to slidingly engage and ride upon the second inclined rails, thereby slidingly mounting the outfeed table 24 on the second inclined track 27 of the base 26. Thus, the height of the outfeed table 24 and the outfeed surface 18 relative to the base 26 and the cutting member 28 may be adjusted by sliding the outfeed table 24 to an appropriate position along the length of the second inclined rails and securing the outfeed table 24 in the position. It will further be appreciated that upper and lower outfeed table stops (not shown) may be provided to restrict the outfeed table 24 from sliding off of the upper or lower ends of the second inclined rails, and thus detaching the outfeed table 24 from the base 26.

The jointer 20 further includes a cutting member 28. The cutting member 28 may be in the form of an elongate cylinder, formed from a rigid material such as steel or the like, having one or more elongate cutting blades mounted thereon so that a cutting edge of each blade is exposed to cut a workpiece. The cutting member 28 is mounted for rotation within the recess 30, adjacent to and between the infeed table 22 and the outfeed table 24. The cutting member 28 is mounted for rotation along an axis disposed at a fixed height relative to the base 26. Accordingly, it will be appreciated that the height of the infeed and outfeed tables 22 and 24, respectively, may be adjusted relative to the cutting member 28 by appropriately positioning and securing the infeed and outfeed tables 22 and 24, respectively, along the first and second inclined tracks 25 and 27, respectively. In particular, lowering the infeed table 22 along the first inclined track 25 will cause a greater portion of the cutting member 28 to be exposed above the infeed surface 17. It will be understood that, by lowering the infeed table 22 along the first inclined track 25, the portion of the cutting member 28 exposed above the infeed surface 17 will contact a workpiece advanced toward the cutting member 28 along the infeed surface 17, thereby removing a greater amount of material from the workpiece. It will further be understood that, in like fashion, raising the infeed table 22 along the first inclined track 25 will expose a smaller portion of the cutting member 28 above the infeed surface 17, thereby reducing the amount of material that would be removed from a workpiece advanced along the infeed table 17 into the cutting member 28.

As shown in FIGS. 1 and 2, the jointer 20 may additionally include a cutting member guard 34 and a fence 36. The cutting member guard 34 is pivotably mounted at a fixed height relative to the cutting member 28 on cutting member guard pivot 35. The cutting member guard 34 is biased into place over the cutting member 28 by a biasing spring (not shown) disposed on the cutting member guard pivot 35. The biasing spring and cutting member guard 34 are adjusted such that the biasing spring biases the cutting member guard 34 into a position over the cutting member 28. Accordingly, unless the force of the biasing spring is overcome during operation of the jointer 20, as described in greater detail below, the cutting member guard 34 will cover any portion of the cutting member 28 that is exposed above the infeed and outfeed tables 22 and 24, respectively. The fence 36 preferably includes an elongate wall 38, formed from a rigid material such as steel or the like, that is used to guide workpieces (not shown) toward the cutting member 28. The fence 36 is disposed along at least a portion of the length of infeed and outfeed surfaces 17 and 18, respectively, and the plane of elongate wall 38 is substantially perpendicular to the axis of rotation of cutting member 28. As is known in the art, the lateral position and orientation of the fence 36 may be adjustable to change its position relative to the cutting member 28.

Figure 10:
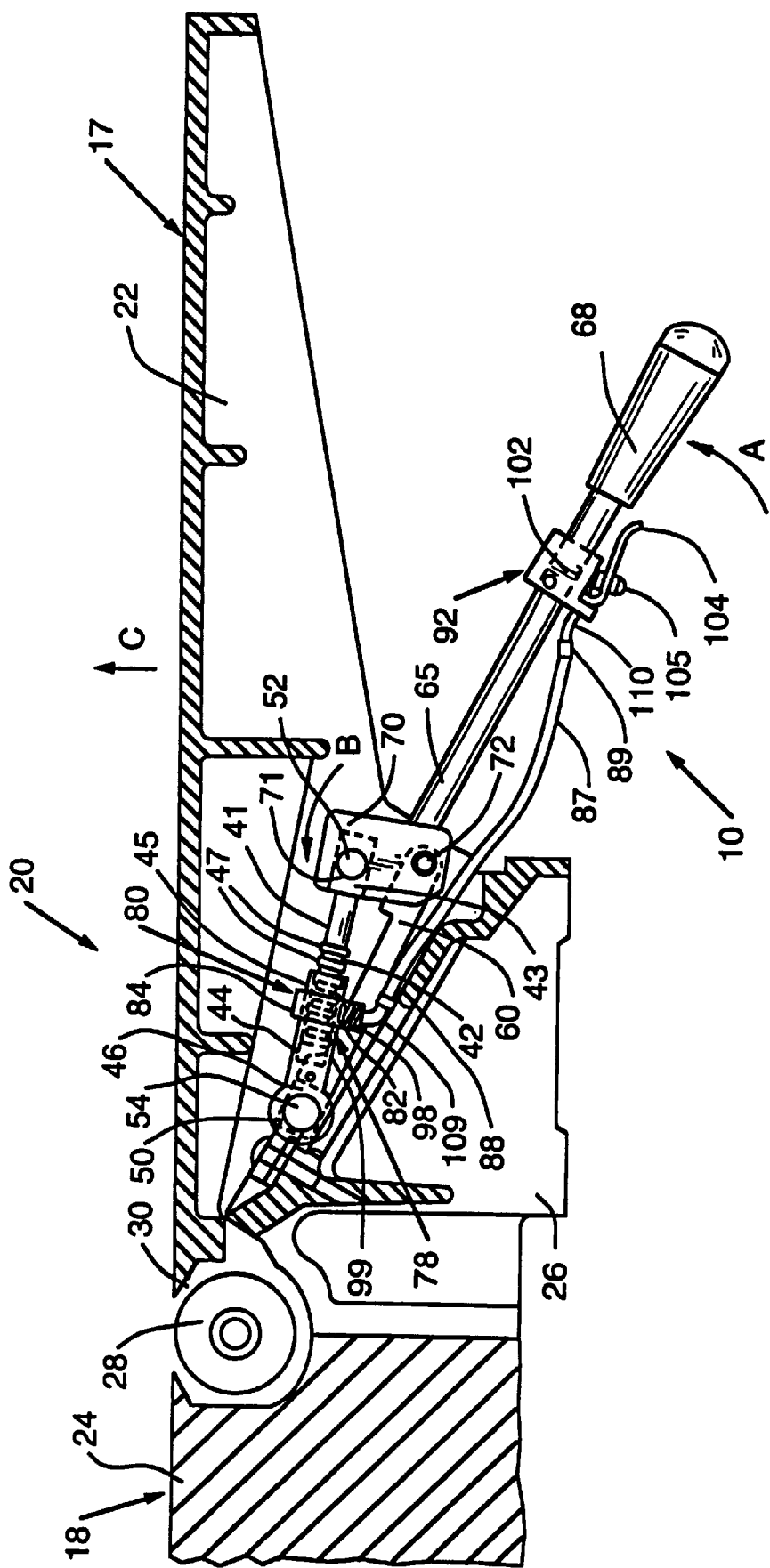
FIG. 10 is a partial cross-sectional front elevational view of a portion of the jointer of FIG. 1, particularly showing elements of the adjustment mechanism of FIG. 1 and showing the infeed table in a raised position.
Figure 11:
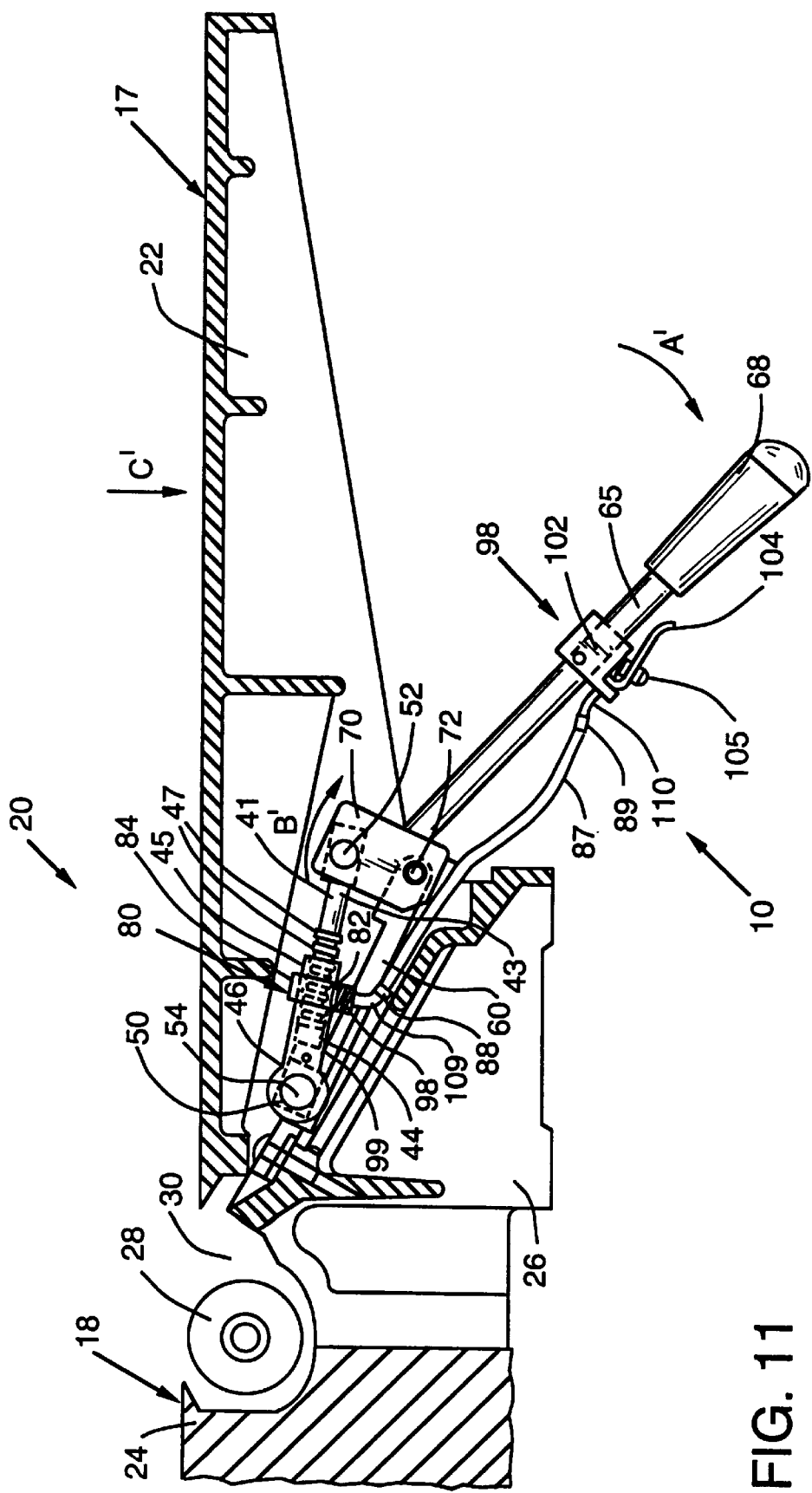
FIG. 11 is a partial cross-sectional front elevational view of a portion of the jointer of FIG. 1, particularly showing elements of the adjustment mechanism of FIG. 1 and showing the infeed table in a lowered position.

The position of the infeed table 22 along the first inclined track 25 is adjusted relative to the cutting member 28 using the adjustment mechanism 10 of the present invention, as described in detail below. Once the position of the infeed table 22 has been selected, a wooden workpiece (not shown) may be placed onto the infeed surface 17. The workpiece is advanced along the infeed surface 17 toward the cutting member 28. When the workpiece contacts the cutting member guard 34, the workpiece forces the cutting member guard 34 to rotate about pivot 35 away from the cutting member 28, thus exposing that portion of the cutting member 28 above the infeed surface 17. As the workpiece passes over the rotating cutting member 28, material is removed from the workpiece. As explained above, the amount of material that is removed from a workpiece will be dependent upon the height of the infeed surface 17 relative to the cutting member 28. In particular, as shown by comparing FIGS. 10 and 11, the lower the height of the infeed surface 27 relative to the cutting member 28, the greater the portion of the cutting member 28 that is exposed above the infeed surface 17, and the greater the amount of material that will be removed from a workpiece.

After passing over the cutting member 28, the workpiece advances onto and is supported by the outfeed surface 18. When the entire length of the workpiece has passed over the cutting member 28 and onto the outfeed surface 18, the cutting member guard 34 rotates about the cutting member guard pivot 35 back over the cutting member 28 by force of the biasing spring.

The construction of the adjustment mechanism 10 for adjusting the height of infeed table 22 will now be described. The height of outfeed table 24 of the jointer 20 relative to the cutting member 28 may be adjusted using a conventional height adjustment mechanism as is known in the art, without employing the adjustment mechanism 10 of the present invention. Nevertheless, although the jointer 20 is described herein as including a conventional height adjustment mechanism associated with outfeed table 24, it will be understood that the adjustment mechanism 10 of the present invention, as hereinafter described in greater detail, may be adapted for use with both the infeed and outfeed tables 22 and 24, respectively.

Figure 3:
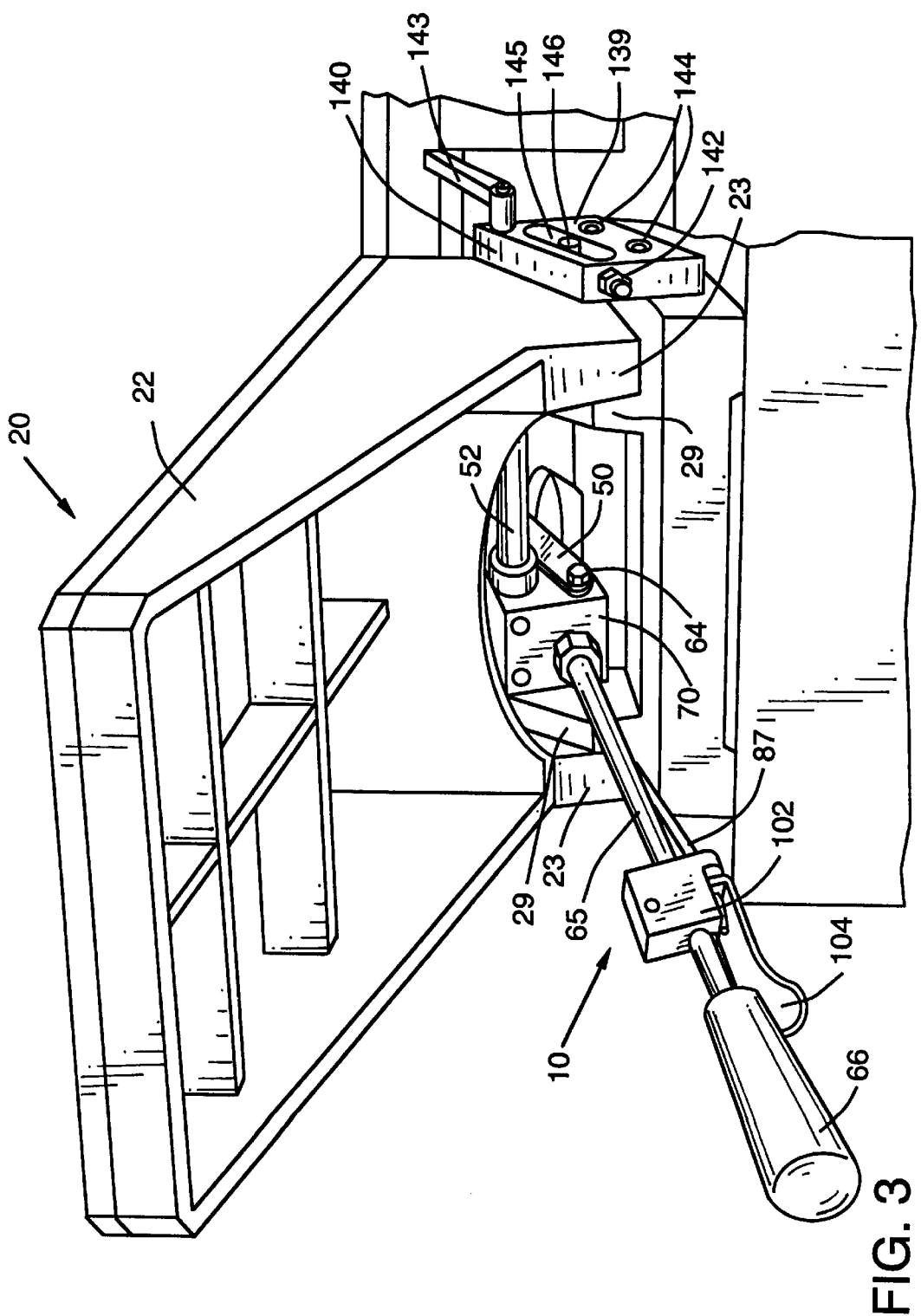
FIG. 3 is a perspective view of a portion of the jointer of FIG. 1, taken from the right side toward the rear side, and particularly showing elements of the adjustment mechanism of FIG. 1.
Figure 4:
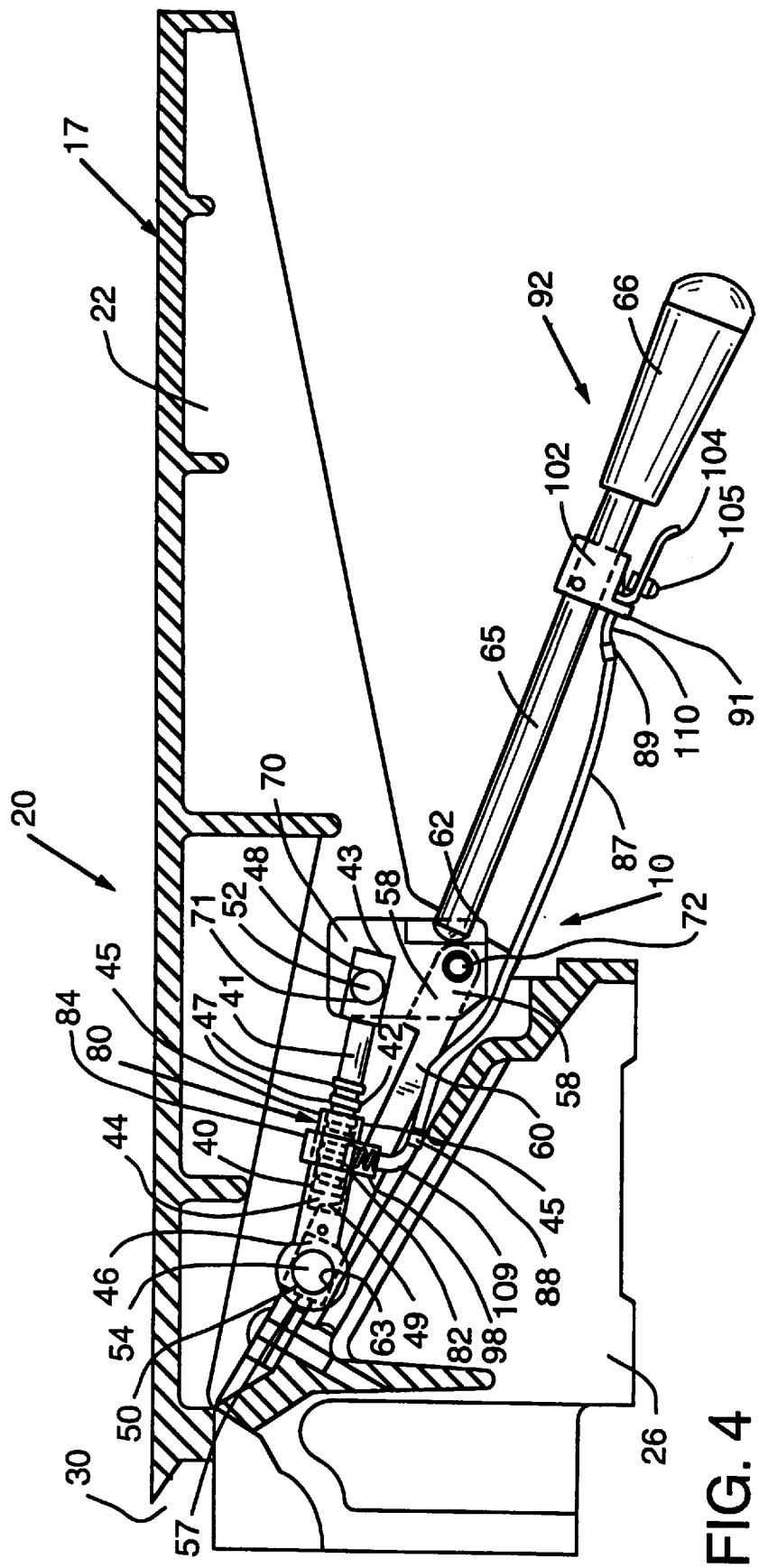
FIG. 4 is a partial cross-sectional view of a portion of the jointer of FIG. 1, particularly showing elements of the adjustment mechanism of FIG. 1.
Figure 5:
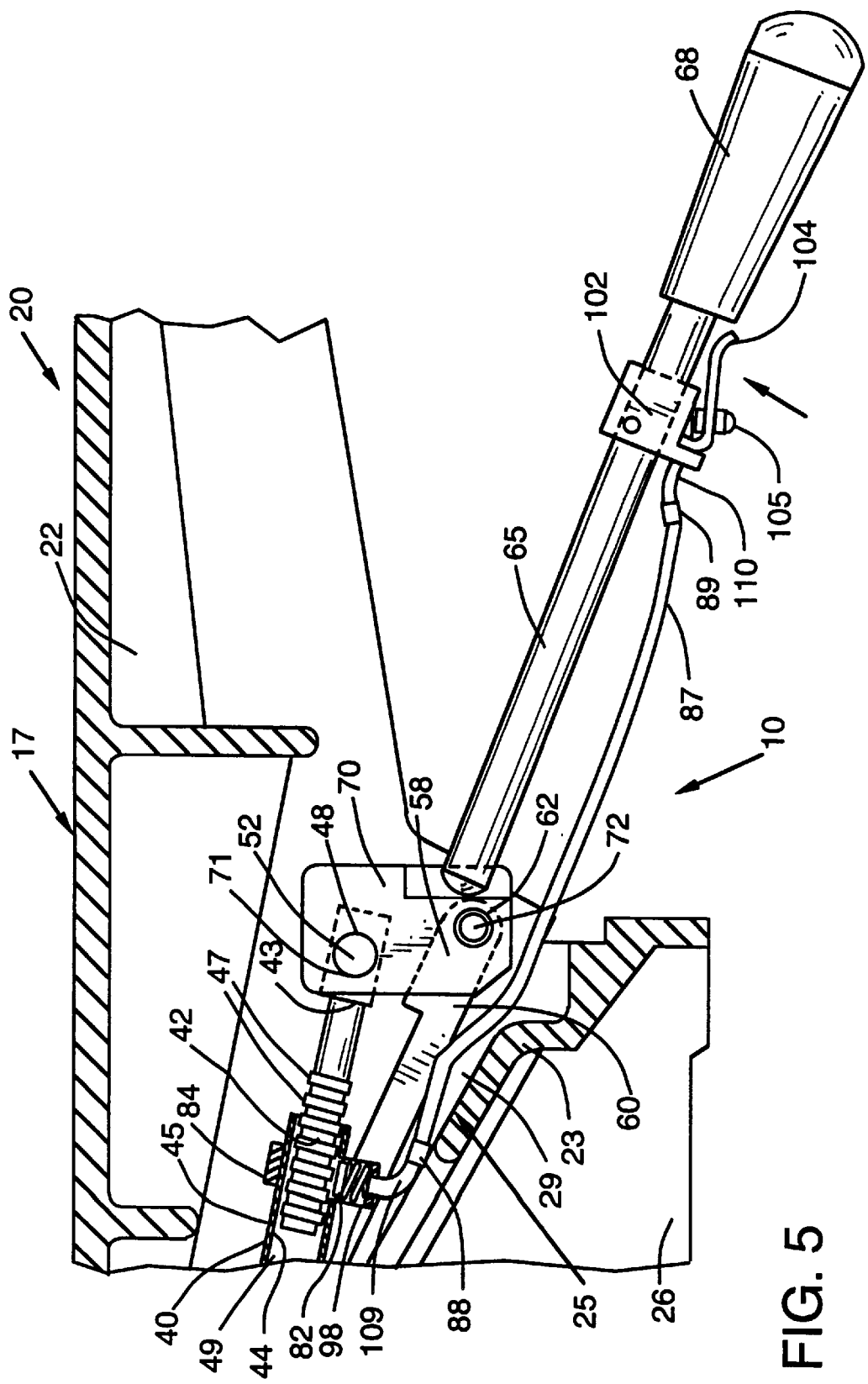
FIG. 5 is a partial cross-sectional view of a portion of the jointer of FIG. 1, particularly showing elements of the adjustment mechanism of FIG. 1, in the disengaged orientation.

FIG. 3 is a perspective view of a portion of the jointer 20, taken from the right side and slightly to the rear (relative to the front perspective view of FIG. 1), particularly showing several of the elements of adjustment mechanism 10. FIG. 4 is an elevational view in section through the infeed table 22 and a portion of the base 26, exposing elements of the adjustment mechanism 10. As shown in those figures, the adjustment mechanism 10 of the present invention generally includes a first or telescoping arm 40, and also includes second and third arms in the form of, respectively, a second or fixed arm 60 and a third or floating arm 70. The adjustment mechanism also includes a locking mechanism 80. The arrangement of these elements is shown in detail in FIG. 5. The telescoping arm 40, fixed arm 60, and floating arm 70 are interconnected as described below. Telescoping arm 40 is adjustable in length as follows. Telescoping arm 40 includes two members or sections in the form of a first section 41 and a second section 44. The first section 41 is slidably received within the second section 44. The first section 41 is formed from an elongate shaft fabricated from a rigid material such as steel or the like. The first section 41 includes a threaded end 42 and a first mounting end 43. The first mounting end 43 includes a first shoulder bore 48 running transversely therethrough. The threaded end 42 has a circular cross-sectional area and includes a plurality of annular threads 47 disposed about the surface thereof. The second section 44 is formed from an elongate shaft fabricated from a rigid material such as steel or the like. The second section 44 includes a sleeve end 45 and a second mounting end 46. The second mounting end 46 includes second shoulder bore 50 running transversely therethrough. The sleeve end 45 preferably has a circular cross-sectional area and includes a bore 49 running axially therethrough to form a cavity therein. The bore 49 is adapted to slidably accept threaded end 42 therein. Bore 49 has a diameter closely corresponding to that of the outer diameter of the threads 47 on threaded end 42. Thus, the sleeve end 45 is adapted to slidably accept threaded end 42 therein, in close communication therewith, by way of bore 49.

The telescoping arm 40 is thus pivotally mounted at the first mounting end 43 and the second mounting end 46 between a first transverse member 52 and a second transverse member 54, respectively. In particular, the first mounting end 43 of telescoping arm 40 is pivotally journaled about the first transverse member 52 disposed within first shoulder bore 48. The first transverse member 52 may be provided as a pivot shaft, fabricated from a rigid material such as steel or the like, having a circular cross-section. The first transverse member 52 is fixedly mounted to the underside of infeed table 22 adjacent and generally perpendicular to infeed table rails 23. The second mounting end 46 of the telescoping arm 40 is pivotally journaled about the second transverse member 54 disposed within second shoulder bore 50. The second transverse member 54 may also provided as a pivot shaft, fabricated from a rigid material such as steel or the like, having a circular cross-section. The second transverse member 54 is fixedly mounted to base 26 adjacent to first inclined surface 25 and generally perpendicular to inclined rails 29. The first transverse member 52 is mounted such that its longitudinal axis is the second transverse member 57. By this arrangement, the telescoping arm 40 is pivotally journaled at the first mounting end 43 and the second mounting end 46 between the base 26 and infeed table 22, respectively.

While the embodiment of the adjustment mechanism 10 of the present invention shown in the accompanying figures depicts the first section 41 of telescoping arm 40 journaled to the infeed table 22 and the second section 44 of telescoping arm 40 journaled to the base 26, the adjustment mechanism 10 of the present invention includes alternate embodiments (not shown) in which, for example, the first section 41 of telescoping arm 40 is mounted to the base 22 and the second section 44 of telescoping arm 40 is mounted to the infeed table 22. It will be appreciated that such embodiments otherwise operate in a manner substantially similar to that of the embodiment depicted in the figures and described herein.

The floating arm 70 includes a first transverse bore 71 and a second transverse bore 72 running transversely therethrough. First transverse bore 71 is configured to accept the first transverse member 52 therethrough. Accordingly, it will be understood that floating arm 70 is pivotally journaled about first transverse member 52 on first transverse bore 71. Second transverse bore 72 is a generally cylindrical threaded bore. The operation of second transverse bore 72 will be described in further detail below with regard to the fixed arm 60.

Fixed arm 60 is formed from an elongate plate fabricated from a rigid material such as steel or the like. Fixed arm 60 includes a first end 57 and a second end 58. The second end 58 includes a first mounting bore 62 running transversely therethrough. The axis of first mounting bore 62 is maintained coincident with the second transverse bore 72 of floating arm 70 by a mounting connector 64 (see FIG. 3), which may be, for example, a threaded connector such as a bolt, screw, or the like sized to threadedly engage threads of the second transverse bore 72 of floating arm 70. The first end 57 of fixed arm 60 includes a second mounting bore 63 running transversely therethrough. Second mounting bore 63 is adapted to accept second transverse member 54 therethrough. The fixed arm 60 is thus pivotally journaled about second transverse member 54 within second mounting bore 64. It will thus be appreciated that fixed arm 60 is pivotally connected to the base 26 and to the floating arm 70 by the first transverse member 52 and the mounting connector 64, respectively. Thus, the telescoping arm 40, fixed arm 60, and floating arm 70 are pivotally interconnected to form a generally triangular arrangement in which one side of the triangle (the telescoping arm 40) is variable in length.

The floating arm 70 may have a lever 65 attached thereto. Lever 65 may be in the form of a rod, formed from a rigid material such as steel or the like, having a first end 67 and a second end 68. The first end 67 includes a plurality of threads (not shown) disposed about the surface thereof The threads are adapted to engage a set of corresponding threads in a bore in floating arm 70. The lever 65 is thus threadedly anchored to floating arm 70. A nut 74, shown in FIG. 3, may also be threadedly disposed about the threads on first end 67 in order to better ensure that the lever 65 is secured to the floating arm 70. The second end 68 may include a handle grip 66 disposed thereon to facilitate an operator's manipulation of the lever 65. The handle grip 66 may be formed from rubber, foam, or other suitably force absorbing and slip resistant material. Accordingly, it will be appreciated that movement of the lever 65 will move the floating arm 70 and, as further described below, will affect the orientation of other elements of the adjustment mechanism 10 to thereby affect the elevation of first inclined surface 25.

The adjustment mechanism 80 is adapted to allow an operator to adjust the length of the telescoping arm 40. The adjustment mechanism 80 generally includes a detent mechanism 78 and a detent actuator 92. The detent mechanism 78 generally includes a detent collar 84, a detent body 82, and a detent body biasing member 98. Detent collar 84 may be formed from a generally rectangular piece of rigid material, such as steel or the like, having a cavity 99 therein. The detent collar 84 is fixedly mounted about the outer surface of the sleeve end 45 of the second section 44 of telescoping arm 40. A notch 85 is provided in the portion of the outer surface of the sleeve end 45 about which detent collar 84 is mounted. The width of the notch 85 corresponds to that of the cavity 99 in the detent collar 84. Accordingly, the notch 85 provides for direct communication between the cavity 99 and the bore 49. Detent body 82 includes a cylindrical mass, formed from a rigid material such as steel or the like, slidably seated within the cavity 99 in close communication with the sides thereof. The lower surface of detent body 82 forms an engagement surface 83. The engagement surface 83 is concave and includes a plurality of threads 81 disposed thereon. The arc of the engagement surface 83 and the size and placement of the threads 81 thereon are adapted so that the engagement surface 83 may engage and hold the threads 47 disposed about the outer surface of the threaded end 42 of the second section 44 of telescoping arm 40 when placed in contact therewith. It will be appreciated that further embodiments (not shown) of the present invention may include the use of alternate apparatus for achieving engagement between the engagement surface 83 and the threaded end 42 of the second section 44. For example, the second section 44 may include one or more indexing holes and the engagement surface 83 may include an indexing pin adapted to engage the indexing holes.

The upper surface 97 of cavity 99 of detent collar 84 is provided with an eyelet 81 therethrough. The diameter of eyelet 81 is smaller than the width of cavity 99. Accordingly, the upper surface 97 forms a shoulder 93 about the circumference of eyelet 81. The detent body biasing member 98 is provided within cavity 99 between the shoulder 93 and the detent body 82. The detent body biasing member 98 preferably includes a coil spring having an inner coil diameter that is less than the width of detent body 82 and an outer coil diameter that, when in a compressed state, is substantially equal to the width of cavity 99. It will thus be appreciated that the detent body biasing member 98 acts to bias the detent body 82 away from shoulder 93 in the direction of the notch 85. The detent body biasing member 98 is preferably of sufficient length, relative to the length of cavity 99 and detent body 82, to maintain the engagement surface 83 of detent body 82 in engagement with the threads 47 of threaded end 42.

As shown in particular in FIGS. 3 and 4, the detent actuator 92 generally includes a trigger bracket 102 having a trigger 104 pivotally mounted thereon. The trigger bracket 102 includes an eyelet 91 therethrough and is mounted on lever 65 adjacent to handle grip 66. Trigger 104 is pivotally mounted on trigger bracket 102 such that it extends in the same general direction as that of lever 65. The orientation of the trigger 104 and trigger bracket 102 allows for simultaneous manipulation of the lever 65 and trigger 104 with a single hand disposed on the handle grip 66.

The detent actuator 92 further includes a cable 86 connecting detent mechanism 78 and detent actuator 92. In particular, cable 86 serves to physically interconnect the trigger 104 to the detent body 82. Accordingly, cable 86 preferably includes a metal wire having two ends and possessing sufficient strength and flexibility to actuate the detent mechanism 78 against the force of detent body biasing member 98, as described in greater detail below. One end of cable 86 is disposed through eyelet 81 in detent collar 84, passes through the length of detent body biasing member 98, and is integrally attached to detent body 82. The other end of cable 86 is disposed through eyelet 91 in trigger bracket 102 and is joined to trigger 104. The apparatus for joining the cable 86 to the trigger 104 may take a variety of forms known in the art. For example, as depicted in the figures, a bolt 105 is engaged within a threaded bore (not shown) in the trigger 104. The cable 86 may be held in compression between the head of the bolt 105 and the trigger 104.

The length of cable 86 is slidably disposed within a path formed by first cable guide 109, second cable guide 110, and cable sleeve 87. Each of the first and second cable guides 109 and 110, respectively, may be in the form of a hollow tube having a smooth inner surface. First cable guide 109 is positioned adjacent to and in registration with eyelet 81. Second cable guide 110 is positioned adjacent to and in registration with eyelet 91. Accordingly, first and second cable guides 109 and 100, respectively, serve to guide the cable 86 into eyelets 81 and 91, respectively, as described above. The cable sleeve 87 may be in the form of a hollow tube formed from a resilient and flexible material such as rubber, plastic, or the like, having grommets 88 and 89 at the ends thereof. Grommets 88 and 89 are formed from a rigid material such as steel or the like and include eyelets (not shown) through which the ends of cable 86 are disposed. The sleeve 87 is oriented such that the grommets 88 and 89 abut cable guides 109 and 110, respectively, and such that the eyelets of grommets 88 and 89 are positioned in registration therewith. Accordingly, it will be appreciated by the skilled artisan that the cable 86 passes out of eyelet 81, through first cable guide 109, through the length of cable sleeve 87, through second cable guide 110, and into eyelet 91.

Thus, as noted above, the detent body biasing member 98 serves to bias the detent body 82 into engagement with the threaded end 42 of the first section 41 of telescoping arm 40. As indicated in particular in FIG. 5, actuation of the trigger 104 serves to place sufficient tension on the cable 86 that the biasing force of the detent body biasing member 98 is overcome and the detent body 82 is displaced within the cavity 99 and into a disengaged position in which the detent body 82 is out of engagement with the threaded end 42. As shown in particular in FIG. 6, when the trigger 104 is released, the force of the detent body biasing member 98 again restores the detent body 82 to an engaged position in which the detent body 82 is in engagement with the threaded end 42.

Figure 6:
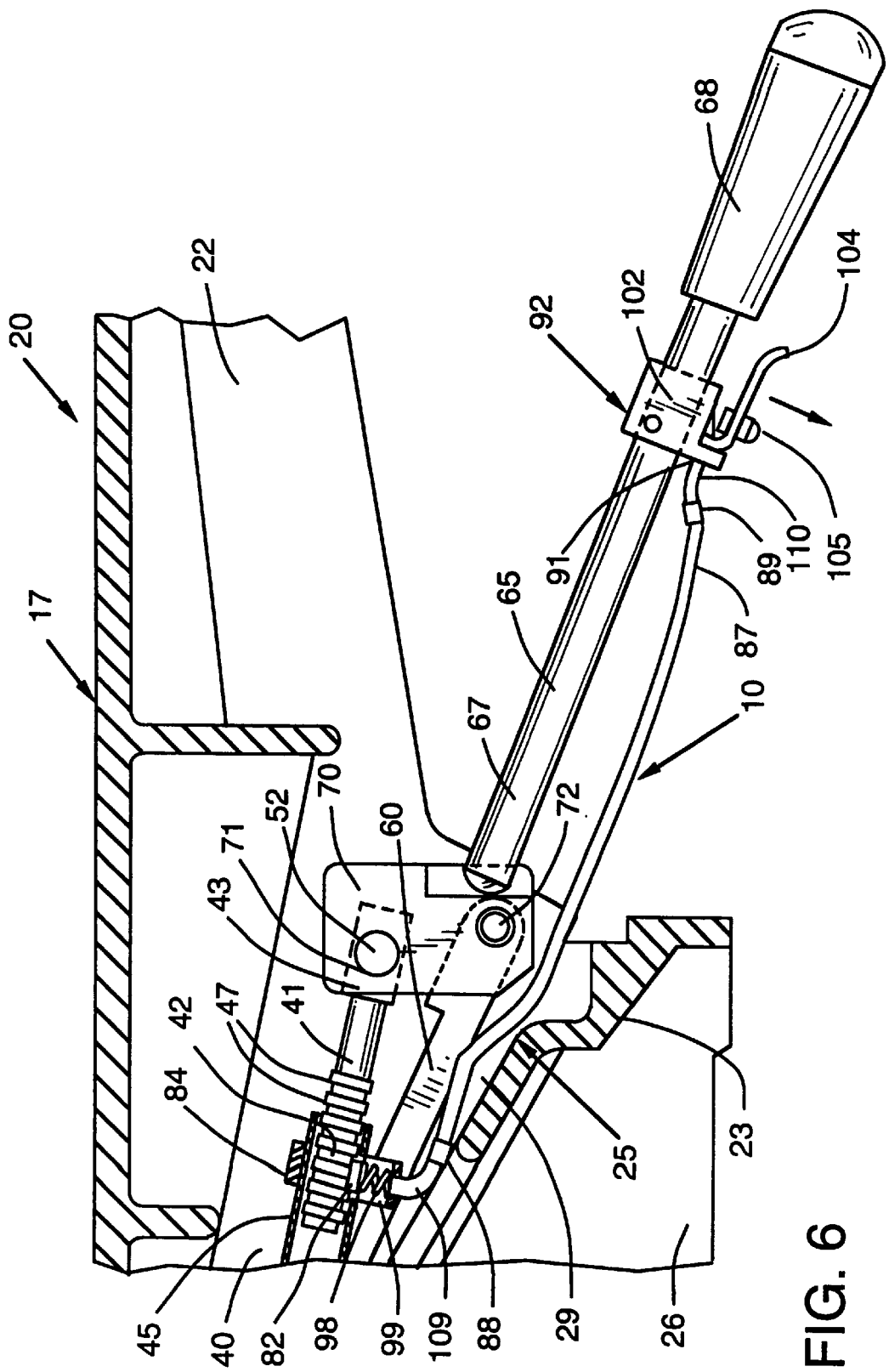
FIG. 6 is a partial cross-sectional view of a portion of the jointer of FIG. 1, particularly showing elements of the adjustment mechanism of FIG. 1 in the engaged orientation.
Figure 7:
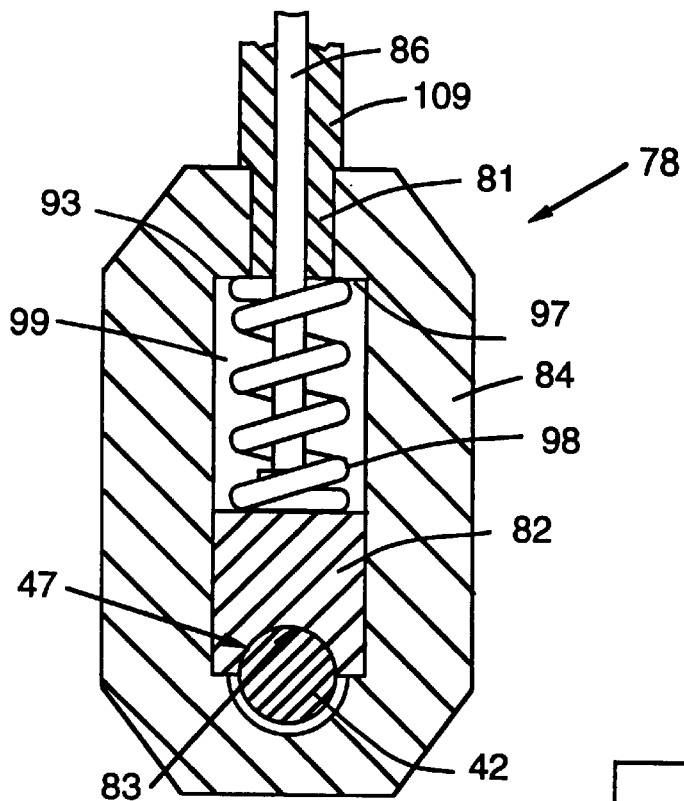
FIG. 7 is a partial cross-sectional view illustrating the detent arrangement of the adjustment mechanism of FIG. 1 in the engaged position.
Figure 9:
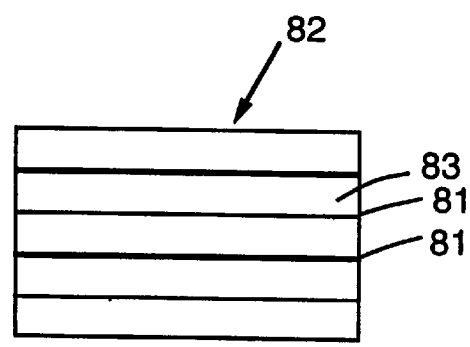
FIG. 9 is a view of the engagement surface of the detent body of the adjustment mechanism of FIG. 1.
Figure 8:
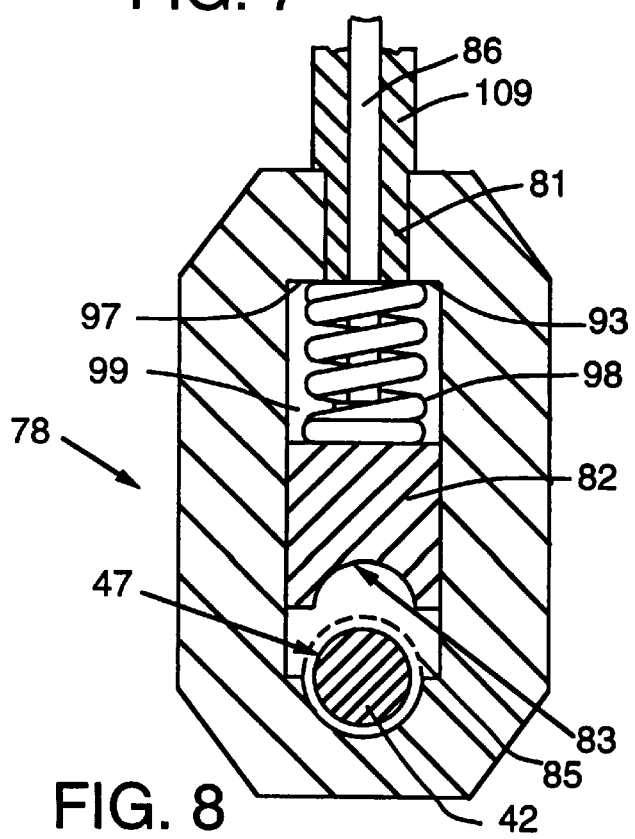
FIG. 8 is a partial cross-sectional view illustrating the detent arrangement of the adjustment mechanism of FIG. 1 in the disengaged position.

Thus, it will be appreciated that in the disengaged position (see FIGS. 5 and 8), the length of telescoping arm 40 may be adjusted, while in the engaged position (see FIGS. 6 and 7) the length of the telescoping arm 40 is held fixed by the action of the detent body 82 on the threaded end 42. As shown in particular in FIG. 5, when the engagement surface 83 of the detent body 82 is disengaged from the threads 47, the first section 41 of the telescoping arm 40 is free to slide within the second section 44 of the telescoping arm 40. However, as shown in FIG. 6, when the engagement surface 83 of the detent body 82 is engaged with the threads 47, the first section 41 of the telescoping arm 40 is held fixed within the second section 44 of the telescoping arm 40. Accordingly, only when the detent body 82 is disengaged from the threads 47 may the length of the telescoping arm 40 be adjusted.

As noted above, the telescoping arm 40 is pivotally interconnected between the first transverse member 52 and the second transverse member 54. Thus, adjusting the length of the telescoping arm 40 will serve to adjust the distance between first transverse member 52 and second transverse member 54. In particular, increasing the length of telescoping arm 40 increases the distance between first and second transverse members 52 and 54, respectively, and decreasing the length of telescoping arm 40 decreases the distance between first and second transverse members 52 and 54, respectively. Further, as noted above, the first transverse member 52 is fixedly mounted relative to the infeed table 22 and the second transverse member 54 is fixedly mounted relative to the base 26. Accordingly, it will be understood that adjustment of the distance between the first and second transverse members 52 and 54, respectively, results in adjustment of the position of the infeed table 22 relative to the base 26. In particular, decreasing the distance between the first and second transverse members 52 and 54, respectively, results in the infeed table 22 being urged up the first inclined surface 25 (see FIG. 10), and increasing the distance between the first and second transverse members 52 and 54, respectively, results in the infeed table 22 being urged down the first inclined surface 25 (see FIG. 11). In particular, as noted above, it will be appreciated that such upward and downward movement of the infeed table 22 along the first inclined surface 25, necessarily results in the infeed surface 17 being raised or lowered, respectively, relative to the cutting member 28.

While the length of telescoping arm 40 may be increased or decreased, it will be understood that the length of fixed arm 60 remains constant. Accordingly, as shown in particular in FIGS. 10 and 11, the length of telescoping arm 40 may be adjusted by pivoting the floating arm 70 about the second transverse bore 72. In particular, pivoting of floating arm 70 about second transverse bore 72 in a counter-clockwise direction (as shown by arrow B in FIG. 10) will cause the length of telescoping arm 40 to decrease and the infeed table 22 to move up first inclined surface 25. In contrast, pivoting floating arm 70 about second transverse bore 72 in a clockwise direction (as shown by arrow B' in FIG. 11) will cause the length of telescoping arm 40 to increase and the infeed table 22 to move down first inclined surface 25.

It will be appreciated that the lever 65 may be used to assist in such pivoting of the floating arm 70 about the second transverse bore 72. As shown in particular in FIG. 10, it will be understood that upward actuation of lever 65 in the direction indicated by arrow A will cause floating arm 70 to rotate about the second transverse bore 72 in a counter-clockwise direction, as indicated by arrow B. As described above, such action will cause the length of the telescoping arm 40 to decrease and the infeed table 22 will move upward along first inclined surface 25 relative to the base 26, as indicated by arrow C. Conversely, as shown in particular in FIG. 11, downward actuation of lever 65 in the direction indicated by arrow A' will cause floating arm 70 to rotate about the second transverse bore 72 in a clockwise direction, as indicated by arrow B'. As described above, such action will cause the length of telescoping arm 40 to increase and the infeed table 22 will move downward along first inclined surface 25 relative to the base 26, as indicated by arrow C'.

The present invention also may include a positive stop 130. The positive stop 130 is adapted to positively set the height of the infeed table 22 at a predetermined height relative to the cutting member 28. As shown in particular in FIGS. 12 and 13, the positive stop 130 includes an infeed table catch 135, a set pin 132, and a catch pin 133 affixed to the operator's side of the jointer 20. The infeed table catch 135 includes a wedge shaped member having a notch 136 therein. The infeed table catch 135 is pivotally connected to the infeed table 22 about a fixed axis positioned adjacent to the first inclined surface 25 of the base 26. The catch pin 133 is fixedly positioned on the base 26 adjacent to the first inclined surface 25. The catch pin 133 is positioned within the arc formed by the pivoting motion of the infeed table catch 135. As shown in particular in FIG. 13, when the infeed table catch 135 is pivoted into contact with the catch pin 133, the catch pin 133 becomes lodged in the notch 136 of the infeed table catch 135. In addition, as shown in particular in FIG. 12, when the infeed table catch 135 is pivoted away from the catch pin 133 and into contact with the set pin 132, the notch 136 will no longer contact the catch pin 133, and the catch pin 133 will not become lodged in the notch 136. Accordingly, the infeed table catch 135 may be activated to restrict the motion of the infeed table 22 when it is pivoted into place against the catch pin 133 (see FIG. 13). In such a position, the infeed table catch 135 thereby acts to hold the infeed table 22 at a fixed height relative to the cutting member 28. As depicted in the figures, the notch 136 and catch pin 133 are oriented such that they fix the infeed table at a height of about ⅛" below the height of the cutting member 28. It will thus be appreciated that the height at which the infeed table 22 is held by the positive stop 130 is determined by the position of the notch 136 relative to the catch pin 133. Thus, by employing an infeed table catch 133 with a notch (not shown) having an alternate shape and or a catch pin (not shown) having an alternate position, the infeed table catch 133 may be modified to fix the infeed table at various other predetermined heights not shown in the Figures herein.

Figure 12:
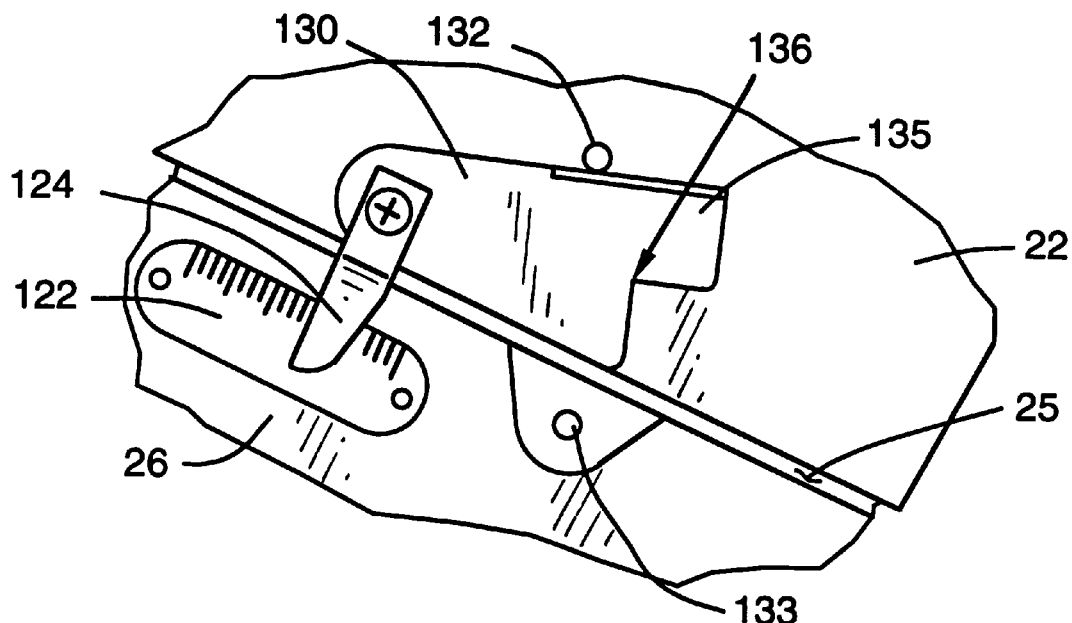
FIG. 12 is a view of the positive stop and height gauge (in the open position) of the adjustment mechanism of FIG. 1.
Figure 13:
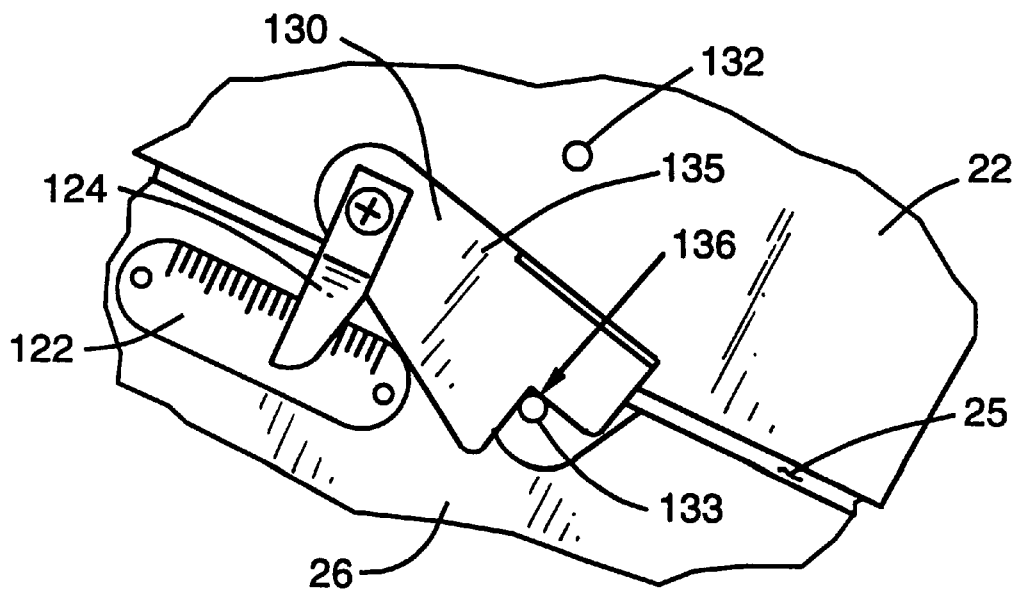
FIG. 13 is a view of the positive stop and height gauge of the adjustment mechanism of FIG. 1 in the closed positions.

As further shown in particular in FIGS. 12 and 13, a height gauge 120 may be provided to provide for increased speed and precision in determining the height of the infeed table 22 relative to the cutting member 28. In particular, the height gauge 120 includes a scale 122 and an indicator 124. The scale 122 is fixedly positioned on the base 26 adjacent and parallel to the first inclined surface 25. The indicator 124 is fixedly positioned on the infeed table 22 perpendicular to the first inclined surface 25. The indicator 124 is further positioned such that it will overlap a portion of the scale 122. In the embodiment of the present invention depicted in the Figures, the scale 122 is calibrated such that the position of the indicator 124 relative to the scale 122 indicates the height of the infeed table 22 relative to the cutting member 28.

Figure 14:
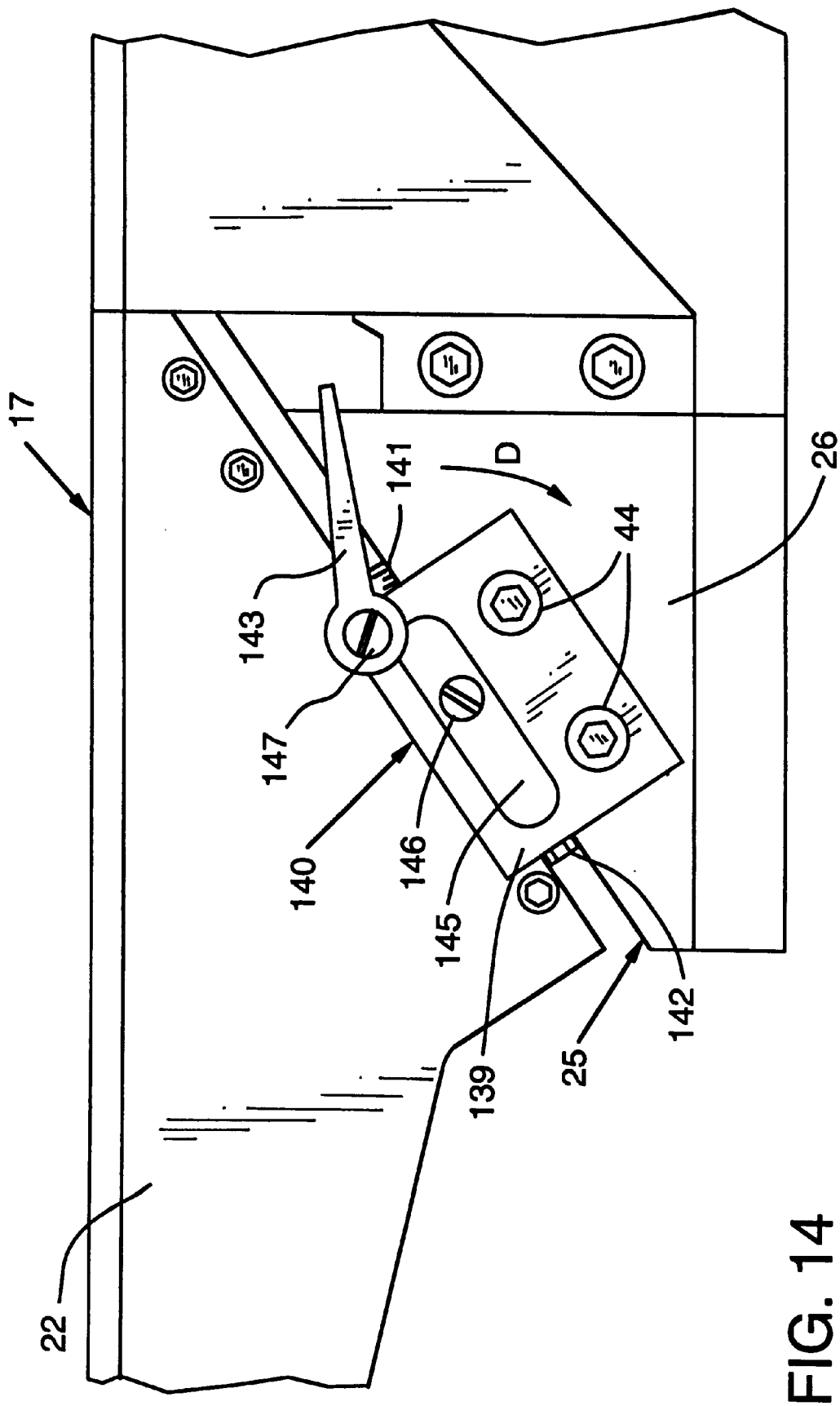
FIG. 14 is a view of the table lock of the adjustment mechanism of FIG. 1.

The present invention may also include an infeed table lock 140 to further restrict movement of and control the height of the infeed table 22 relative to the cutting member 28. As shown in particular in FIGS. 3 and 14, the infeed table lock 140 generally includes a bracket 139 fixedly attached to a side of the base 26 adjacent to the first inclined surface 25. The bracket 139 includes a rectangular member having a slot therethrough. The bracket 139 may be anchored to the base 26 by way of threaded members 144, such as bolts or the like. The bracket 139 may be anchored to the base 26 such that the slot 145 is positioned parallel to the first inclined surface 25. The infeed table 22 is provided with a pin 146 anchored thereto. In particular, the pin 146 is positioned beneath the infeed table 22 and adjacent to the first inclined surface 25 such that the pin 146 is seated within the slot 145. Accordingly, when the height of the infeed table 22 is moved up or down, the pin 146 travels along the length of the slot 145. It will be appreciated that the travel of the pin 146 within the slot 145 is restricted by the length of the slot 145. Thus, the width of the slot 145 may correspond to the maximum and minimum heights to which the infeed table 22 may travel.

The slot 145 may be positioned such that the maximum and minimum height of travel of the infeed table 22 defined by the slot 145 will not allow the infeed table 22 to become derailed from the base 26. However, in certain situations, it may be desirable to further reduce the range over which the infeed table 22 may travel. Accordingly, upper and lower positive stops 141 and 142, respectively, are provided at either end of the slot 145. The upper and lower positive stops 141 and 142, respectively include threaded bolt members, mounted along the same angle as that of the slot 145. Accordingly, tightening the upper and lower positive stops 141 and 142, respectively, will cause them to intrude upon the length of the slot 145, while loosening the upper and lower positive stops 141 and 142, respectively, will cause them to withdraw from the length of the slot 145. It will thus be appreciated that the tightening the upper and lower positive stops 141 and 142, respectively, will reduce the range of travel of the infeed table 22, while loosening the upper and lower positive stops 141 and 142, respectively, will increase the range of travel of the infeed table 22.

In addition, the infeed table lock 140 is adapted to fix the height of the infeed table 22 at any point along the length of slot 145. In particular, the infeed table lock 140 includes a locking handle 143. The locking handle 143 further includes pin 147. The pin 147 has threads (not shown) disposed about the outer surface thereof and is threadedly seated within a threaded bore (not shown) in the bracket 39. Actuation of the locking handle 143 in the direction of the arrow D in FIG. 14 will thus cause the threads of the pin 147 to engage the threads of the bore. Accordingly, as the locking handle 143 is actuated, the pin 147 is threadedly accepted into the bore and the end of the pin 147 passes through the bore and may be brought into frictional communication with the side of the infeed table 22. The friction between the pin 147 and the infeed table 22 is sufficient to maintain the infeed table 22 at a fixed height relative to the cutting member 28. Conversely, actuation of the locking handle 143 in the direction opposite that of arrow D will bring the pin 147 out of frictional communication with the infeed table 22 and allow for adjustment of the height of the infeed table 22 using the adjustment mechanism 10 of the present invention, as described above.

Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. An apparatus including an adjustment mechanism, the apparatus comprising:

a base having a first inclined surface;

a support slidably mounted on said first inclined surface;

a first arm having first and second members, one of said first and second members pivotally mounted to said base about a first axis, the other of said first and second members pivotally mounted to said support about a second axis, said first member including a first bore therein, at least a portion of said second member received and slidably movable within said first bore; and a locking mechanism selectively restraining sliding movement of said second member within said first bore.

2. The apparatus of claim 1, wherein a length of said first arm is varied by varying a position of said second member within said first bore.

3. The apparatus of claim 1, wherein said locking mechanism further comprises:

a detent mechanism fixedly mounted on said first member and including a detent body biased to engage said second member within said first bore; and a detent actuator selectively disengaging said detent body from said second member.

4. The apparatus of claim 3, wherein said detent mechanism further comprises:

a cavity, said cavity in communication with said second member disposed within said first bore;

said detent body slidably disposed within said cavity and having an engagement surface thereon, said engagement surface adapted to engage a surface of said second member within said first bore; and a biasing member within said cavity biasing said engagement surface into engagement with said surface of said second member.

5. The adjustment mechanism of claim 4, wherein said second member comprises a threaded portion, said threaded portion received by and slidable within said first bore, said engagement surface of said detent body having threads thereon to engage said threaded portion of said second member.

6. The apparatus of claim 5, wherein said detent actuator selectively urges said detent body away from said second member such that said engagement surface of said detent body is moved out of engagement with said threaded portion of said second member.

7. The apparatus of claim 4, wherein said detent actuator further comprises:

a cable having a first and a second end, said first end connected to said detent body; and a trigger, said second end of said cable connected to said trigger, actuation of said trigger being transmitted through said cable to said detent body to move said engagement surface of said detent body out of engagement with said threaded portion of said second member.

8. The adjustment mechanism of claim 7, wherein said detent biasing member comprises a coil spring.

9. The apparatus of claim 8, wherein said inclined surface further includes at least one first rail and said support further includes at least one second rail, said at least one second rail slidably engaging said at least one second rail.

10. The apparatus of claim 9, wherein said support further includes a workpiece support surface.

11. The apparatus of claim 10, wherein the apparatus is one of a woodworking machine and a metal working machine having a driven cutting member, and further wherein said support is a workpiece support table disposed adjacent at least a portion of said cutting member.

12. The apparatus of claim 11, wherein the apparatus is a jointer and said support is at least one of a workpiece infeed table and a workpiece outfeed table.

13. The apparatus of claim 7, further comprising:
   a second arm having a fixed length and first and second ends, said first end of said second arm mounted to said base;
   a third arm having a fixed length and primary and secondary ends, said primary end pivotally mounted about said second axis, said secondary end pivotally mounted to said second end of said second arm about a third axis.

14. The apparatus of claim 13, further comprising a lever fixedly mounted to said third arm, movement of said lever pivoting said third arm about said third axis.

15. The apparatus of claim 14, further comprising a bracket attached to said lever, said trigger mounted to said bracket and pivotal thereon.

16. The apparatus of claim 15, wherein said locking mechanism further comprises:
   a cable sleeve having first and second ends, said cable at least partially disposed within said cable sleeve;
   a first cable guide disposed adjacent said detent mechanism and connected to said first end of said cable sleeve, said first cable guide guiding said first end of said cable to said detent body; and
   a second cable guide disposed adjacent said bracket and connected to said second end of said cable sleeve, said second cable guide guiding said second end of said cable to said trigger.

17. An apparatus for one of cutting and abrading a workpiece, the apparatus comprising:
   a base having an inclined surface;
   a workpiece support table movably mounted on said inclined surface;
   a workpiece table elevation adjustment mechanism selectively adjusting an elevation of said workpiece support table relative to said base, said workpiece table elevation adjustment mechanism comprising:
      an adjustable arm of variable length comprising a first end and a second end, one of said first end and said second end pivotally mounted to said base about a first axis, the other of said first end and said second end mounted to said workpiece support table about a second axis, said adjustable arm further comprising first and second sections, said second section including a sleeve portion, a region of said first section received and slidably movable within said sleeve portion; and
      a locking mechanism, said locking mechanism selectively restraining movement of said first section relative to said second section.

18. The apparatus of claim 17, further comprising one of a driven cutting member and a driven abrading member mounted on said base adjacent said workpiece support table.

19. The apparatus of claim 17, wherein said locking mechanism further comprises:
   a detent mechanism, fixedly mounted on said second section and biased to contact said region of said first section within said sleeve portion; and
   a detent actuator, selectively disengaging said detent mechanism from contact with said region of said first section.

20. The apparatus of claim 19, wherein said detent mechanism comprises:
   a cavity in communication with said sleeve portion;
   a detent body disposed and movable within said cavity and having a first surface thereon, said first surface of said detent body selectively engaging said region of said first section; and
   a detent biasing member biasing said detent body so that said first surface of said detent body contacts said region of said first section.

21. The apparatus of claim 20, wherein said first section further comprises a threaded end, said threaded end received by said sleeve portion, said first surface of said detent body including at least one thread thereon, said at least one thread engaging said threaded end of said first section when said first surface engages said region of said first section.

22. The apparatus of claim 21, wherein said detent actuator selectively moves said detent body within said cavity away from said first section to disengage said first surface from said region.

23. The apparatus of claim 22, wherein said detent actuator further comprises:
   a trigger; and
   a trigger bracket, said trigger pivotally mounted on said trigger bracket.

24. The apparatus of claim 23, wherein said detent actuator further comprises a cable having a first and a second end, said first end connected to said detent body, said second end connected to said trigger.

25. The apparatus of claim 25, further comprising:
   a second arm, said second arm having a fixed length and first and second ends, said first end of said second arm pivotally mounted to said base; and
   a third arm, said third arm having a primary end and a secondary end, said primary end pivotally mounted about said second axis, said secondary end pivotally mounted to said second end of said first arm about a third axis.

26. The apparatus of claim 25, further comprising a lever, lever fixedly mounted to said third arm and manipulable by an operator to pivot said third about said third axis.

27. The apparatus of claim 26, wherein said trigger bracket is mounted on said lever.

28. The apparatus of claim 24, wherein pivoting of said trigger about said trigger bracket urges said detent body out of engagement with said first section against the force of said detent biasing member.

29. The apparatus of claim 17, wherein the apparatus is a jointer, the jointer further comprising a cutting member rotatably mounted on said base, said workpiece support table being an infeed table adjacent said cutting member.

30. The apparatus of claim 17, further comprising:
   a pin mounted on one of said base and said workpiece support table; and
   a pin engaging member movably mounted on the other of said base and said workpiece support table, said pin engaging member selectively engaging said pin and thereby maintaining a position of said workpiece support table relative to said base.

31. The apparatus of claim 30, wherein said pin engaging member is rotatably mounted on said other of said base and said workpiece support table, said pin engaging member including a recess, said recess receiving said pin to thereby maintain said position of said workpiece support table relative to said base.

32. An adjustment mechanism for adjusting the position of a surface relative to a first element, the surface resident on a second element, the adjustment mechanism comprising:

a first arm having first and second members, one of said first and second members being pivotally mounted to the first element about a first axis, the other of said first and second members being pivotally mounted to said second element about a second axis, said first member including a first bore therein, at least a portion of the second member received and slidably movable within said first bore; and a locking mechanism selectively restraining sliding movement of said second member within said first bore.

33. The adjustment mechanism of claim 32, a length of said first arm being varied by varying a position of said second member within said first bore.

34. The adjustment mechanism of claim 33, wherein said locking mechanism further comprises:

a detent mechanism fixedly mounted on said first member and including a detent body biased to engage said second member within said first bore; and a detent actuator selectively disengaging said detent body from said second member.

35. The adjustment mechanism of claim 34, wherein said detent mechanism further comprises:

a cavity, said cavity in communication with said second member disposed within said first bore;

said detent body slidably disposed within said cavity and having an engagement surface thereon, said engagement surface adapted to engage a surface of said second member within said first bore; and a biasing member within said cavity biasing said engagement surface into engagement with said surface of said second member.

36. The adjustment mechanism of claim 35, wherein said second member comprises a threaded portion, said threaded portion received by and slidable within said first bore, said engagement surface of said detent body having threads thereon to engage said threaded portion of said second member.

37. The adjustment mechanism of claim 36, wherein said detent actuator selectively urges said detent body away from said second member such that said engagement surface of said detent body is moved out of engagement with said threaded portion of said second member.

38. The adjustment mechanism of claim 33, further comprising:

a second arm having a fixed length and first and second ends, said first end of said second arm mounted to said second element;

a third arm having a fixed length and primary and secondary ends, said primary end pivotally mounted about said second axis, said secondary end pivotally mounted to said second end of said second arm about a third axis.

39. The adjustment mechanism of claim 38, further comprising a lever fixedly mounted to said third arm, movement of said lever pivoting said third arm about said third axis.

40. The adjustment mechanism of claim 33, wherein the surface of the first element is a workpiece support surface of one of a woodworking machine and a metal working machine.

41. An adjustment mechanism for adjusting the position of a workpiece support table of a machine selected from a woodworking machine and a metal working machine relative to a first element of the machine, the adjustment mechanism comprising:

an adjustable arm of variable length comprising a first end and a second end, one of said first end and said second end pivotally mounted to the first element about a first axis, the other of said first end and said second end mounted to said workpiece support table about a second axis, said adjustable arm further comprising first and second sections, said second section including a sleeve portion, a region of said first section received and slidably movable within said sleeve portion; and a locking mechanism, said locking mechanism selectively restraining movement of said first section relative to said second section.

42. The adjustment mechanism of claim 41, wherein said locking mechanism further comprises:

a detent mechanism, fixedly mounted on said second section and biased to contact said region of said first section within said sleeve portion; and a detent actuator, selectively disengaging said detent mechanism from contact with said region of said first section.

43. The adjustment mechanism of claim 42, further comprising:

a second arm, said second arm having a fixed length and first and second ends, said first end of said second arm pivotally mounted to the first element; and a third arm, said third arm having a primary end and a secondary end, said primary end pivotally mounted about said second axis, said secondary end pivotally mounted to said second end of said first arm about a third axis.

44. The adjustment mechanism of claim 41, wherein the machine is a woodworking jointer.

* * * * *